(12) United States Patent
Haynes

(10) Patent No.: US 6,801,261 B1
(45) Date of Patent: Oct. 5, 2004

(54) VIDEO AND/OR AUDIO DIGITAL DATA PROCESSING

(75) Inventor: Andrew Haynes, Shipley (GB)

(73) Assignee: Pace Micro Technology PLC, Saltaire (GB)

( * ) Notice: Subject to any disclaimer, the term of this patent is extended or adjusted under 35 U.S.C. 154(b) by 159 days.

(21) Appl. No.: 09/631,760

(22) Filed: Aug. 3, 2000

(30) Foreign Application Priority Data

Aug. 12, 1999 (GB) .............................................. 9918927

(51) Int. Cl.[7] ........................... H04N 5/445; H04N 5/50
(52) U.S. Cl. ...................... 348/553; 348/563; 348/569; 725/19; 725/18
(58) Field of Search ................................ 348/553, 552, 348/569, 731, 563, 564; 725/58, 61, 44, 45, 46, 33, 38, 131, 9, 18, 14, 134–139, 142, 25, 28, 19; H04N 5/445, 5/50

(56) References Cited

U.S. PATENT DOCUMENTS

| | | | | |
|---|---|---|---|---|
| 4,888,796 A | * | 12/1989 | Olivo, Jr. ..................... 348/460 |
| 5,659,366 A | * | 8/1997 | Kerman ........................ 725/34 |
| 5,699,107 A | * | 12/1997 | Lawler et al. ................. 725/58 |
| 5,857,181 A | * | 1/1999 | Augenbraun et al. .......... 707/2 |
| 5,859,662 A | * | 1/1999 | Cragun et al. ............... 725/137 |
| 6,020,882 A | * | 2/2000 | Kinghorn et al. ............. 725/37 |
| 6,049,333 A | * | 4/2000 | LaJoie et al. ................ 348/564 |
| 6,088,722 A | * | 7/2000 | Herz et al. ..................... 725/46 |
| 6,388,714 B1 | * | 5/2002 | Schein et al. ................ 348/563 |
| 6,470,497 B1 | * | 10/2002 | Ellis et al. ..................... 725/39 |
| 6,483,548 B1 | * | 11/2002 | Allport ........................ 348/564 |
| 2001/0003214 A1 | * | 6/2001 | Shastri et al. ............. 126/1 AD |
| 2002/0056106 A1 | * | 5/2002 | Takahashi et al. ............. 725/44 |
| 2002/0116712 A1 | * | 8/2002 | Schein et al. ................. 725/58 |
| 2002/0133820 A1 | * | 9/2002 | Arai et al. .................... 725/39 |

FOREIGN PATENT DOCUMENTS

| | | |
|---|---|---|
| EP | 094253 A1 * | 9/1999 |
| EP | 0954176 A2 * | 11/1999 |

* cited by examiner

*Primary Examiner*—Sherrie Hsia
(74) *Attorney, Agent, or Firm*—Head, Johnson & Kachigian

(57) ABSTRACT

The invention relates to the processing of digital data which is transmitted by broadcasters of television programs for receipt by users of a broadcast data receiver which includes decoding the transmitted data and then processing the decoded data to generate video and/or audio displays on a television set or other form of display screen in the form of a television program. The television system allows the user to select to monitor a selected program for designated criteria and, if the criteria is/are detected, the system activates an alert for the user, stores the data for the selected program or displays the selected television program thereby allowing the user to be aware of a designated occurrence in the television program even though they were not previously watching the television or were watching another program.

19 Claims, 1 Drawing Sheet

VIDEO AND/OR AUDIO DIGITAL DATA PROCESSING

CROSS-REFERENCE TO RELATED APPLICATIONS

Figure 1:
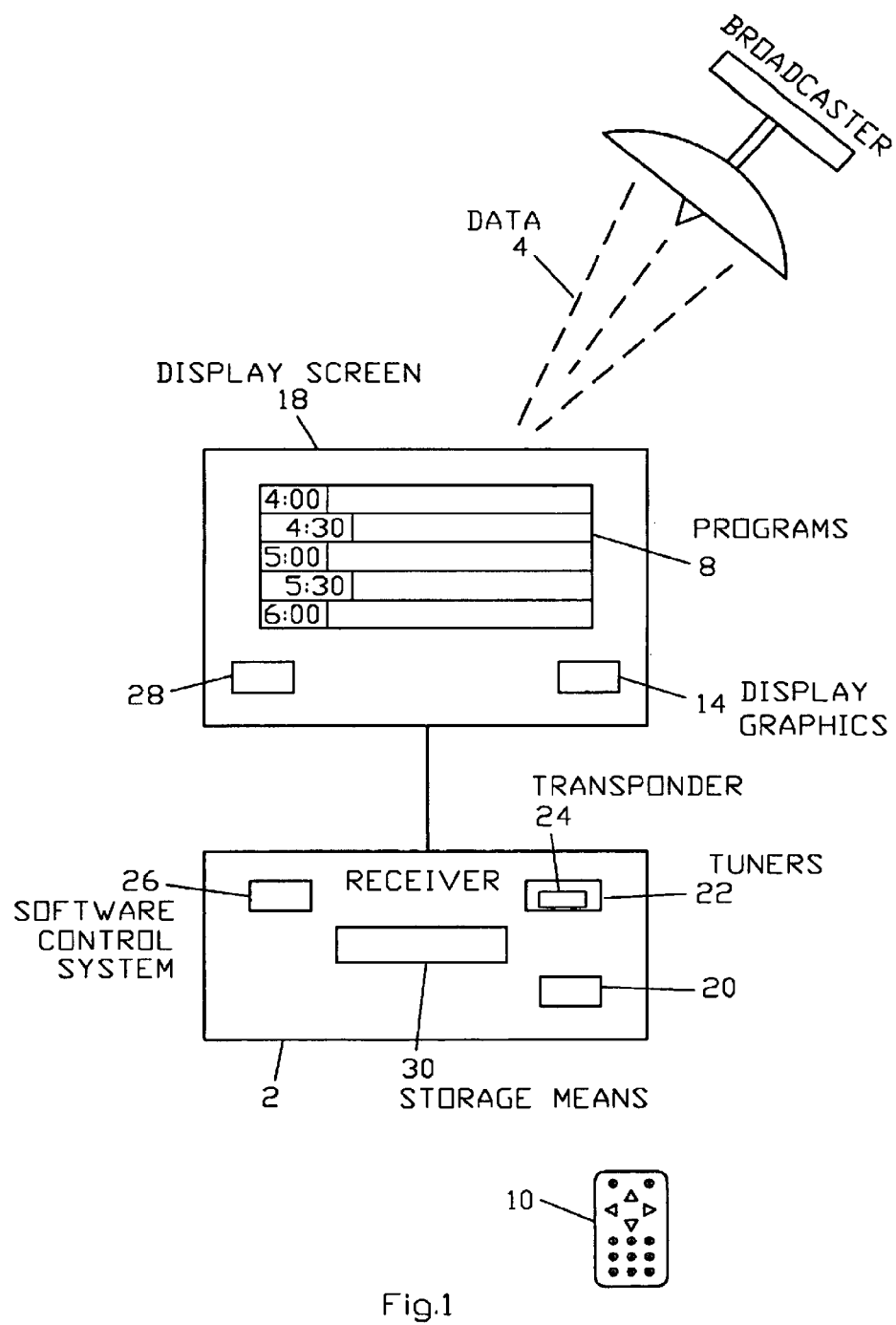

This application claims priority to GB Application No. 9918927.6 filed Aug. 12, 1999.

BACKGROUND OF THE INVENTION

The invention to which this application relates is to the processing of digital data which is transmitted by broadcasters of television programs for receipt by users of a broadcast data receiver which includes a means for decoding the transmitted data, which is typically transmitted in an encoded format, and then processing the decoded data to generate video and/or audio displays on a television set or other form of display screen.

Increasingly, television programs are broadcast using digital data transmission systems and these typically comprise, at the transmission stage, the encoding of streams of data relating to a plurality of television programs and the transmission of the encoded streams of digital data to be received by a plurality of receivers at various premises, via satellite, cable or terrestrial transmission systems. When the streams of digital data are received, they can be decoded by the receiver and then processed. In response to user selections, particular television programs generated from the processed data can be displayed on a television screen or other form of display screen. The user can then select between programs, choose to store program details and so on and may also receive information regarding the various programs which are available to watch at any instant at the present and in the future.

Although it is possible for the receiver to receive a number of different streams of data relating to different television programs, the user can select to view one particular television program at a particular time to be displayed on the display screen with the rest of the program ata effectively disregarded.

SUMMARY OF THE INVENTION

The aim of the present invention is to allow a user of this form of system to be able to receive an indication of a particular occurrence in a television program for which data is received at the receiver and, also, preferably to allow the particular event to be stored and/or displayed to the user.

In a first aspect of the invention there is provided a television system including a broadcast data receiver for receiving audio and/or video digital data from a broadcaster relating to a plurality of television programs and display means for displaying a user-selected television program from the plurality of available television programs and chracterized in that in addition to a means for selecting a television program for display, the system includes the means for the user selection of the same or a further television program to be monitored with respect to designated criteria and, if said designated criteria are met, any of the generation of a visual or audio alert, the recording of the television program or display of the selected television program is activated.

DETAILED DESCRIPTION OF THE PREFERRED EMBODIMENT

In one embodiment, the viewer may select to watch a particular television program or, yet further, may decide to keep the receiving apparatus active but not to watch any particular television program at that time. In either case, the user can select to monitor a television program for which data is received by the receiver in accordance with designated criteria. The designated criteria can be any of a range of criteria such as, for example, the occurrence of a specific word or words in audio data received for the selected television program, a change in pitch of a commentator's voice if there is provided a commentary as part of the audio data, a change in the audio data volume, a particular occurrence in the video data, teletext/subtitle word matching, voice recognition of a particular voice, word or phrase, the elapse of prescribed time period and so on. The criteria which is selected can be with respect to the particular type or form of television program which is selected to be monitored.

In one embodiment, the criteria is selected and generated by the data broadcaster or, by the broadcast data receiver in response to a signal indicating the particular type of television program, or, alternatively, the monitoring criteria can be chosen by the user and typically, chosen by the user from a list of possible criteria. In one embodiment the list of criteria can be displayed on screen and selected by the user using a remote control device 10, via the receiver.

When the monitoring criteria has/have been selected, in one embodiment the television program which has been selected for monitoring, and in particular the data relating to that television program, are processed by the receiver and monitored for the occurrence of the selected criteria. If the selected criteria is/are identified then one or a number of situations may arise. In one embodiment, when the criteria is identified, if the display screen is switched on and/or is on a standby mode, the television program which is being monitored is caused to be displayed on the screen by the receiver. This means that the user will then be able to watch the television program upon the occurrence of the criteria in the program. In one embodiment the television program can then be watched by the user until the user selects not to or, alternatively, the television program is provided for viewing for a predesignated period of time whereupon the display screen either returns to a standby mode or to the television program which was previously being watched.

In addition, or alternatively, an alert signal is indicated to the user either visually on screen and/or audibly that a criteria detection has taken place in the monitored television program and the user can then decide whether to select to watch the monitored television program or alternatively may simply be content that they have been informed of a particular occurrence. Yet further and in addition or alternatively, the receiver can be connected to a storage means or, alternatively, may be provided with storage means as part of the receiver and in which case the detection of designated criteria causes material from the television program in the form of video and/or audio data to be recorded and held in memory thereby providing a record of the data relating to the detected criteria. Typically, the quantity of data stored upon the detection of the criteria can be selected by the user. The user can then subsequently access the stored data and select to watch the same.

In an alternative embodiment the data for a selected television program can be monitored for designated criteria by the broadcaster of the data. If the criteria is detected the broadcaster can transmit in addition to the normal data, data to indicate the detection (hereinafter referred to as event trigger data) alongside the audio and video data for the television program to provide a reliable trigger for selected events. In this embodiment the sending of the same is under the control of the television program broadcaster. In any case the event trigger data can be detected by the broadcast data receiver and processed to cause a desired function with regard to the selected television program to occur.

It is envisaged that the subject matter of this invention will be of particular use in allowing the user to be informed of, create and/or view the highlights of a television program which is being monitored. Said highlights could be, for example, with respect to a game show, the winning in of particular prizes, or alternatively, with regard to a sporting event such as football, the scoring of the goals in the game. Furthermore, it allows the user to undertake other activities confident that they will be able to gain access to the highlights without being required to watch the entire television program.

A specific embodiment of the invention is now described with respect to a television system which allows the transmission of video and/or audio data to a broadcast data receiver 2 in a premises. The receiver is capable of receiving a number of streams of said digital and audio data 4 which relate to a variety of television programs 8 which are available to be selected for viewing by the user of the receiver. The receiver is used to decode the data which is received and allows processing of the data so that the selected television program can be viewed when required via a television screen or other type of display screen 18. If, for example, one of the television programs relates to a cricket or a baseball match, the data which is received for that match will comprise video data and audio data. If the user of the receiver is interested in the sport but does not have the time or may not wish to watch the entire match on the television or may wish to listen to the commentary only or may wish to watch other programs for the duration of the match, they can select, in accordance with the invention, for the receiver to monitor the match data.

The user can then set the receiver into a monitoring state 20. This can take the form of a long term monitoring mode where the user is alerted to an item of interest. A discrete graphic icon 14 can be provided on screen to indicate that the monitoring mode is activated. The monitoring mode can be altered to change the criteria being monitored or to be disabled at any given time.

In one embodiment the system includes multiple, front end, tuners 22 and a series of transponders 24 and one transponder can be set to monitoring a program whilst the user watches a different program, with data received via a second transponder.

The monitoring of the match data is undertaken by a software control system 26 within the broadcast data receiver which allows the monitoring of the data for the occurrence of specific criteria. For example, future pattern recognition software can be used to monitor the commentary and listen for particular words, change in volume and so on.

Alternatively, and as a further aspect of the invention, event trigger data can be broadcast alongside the audio and video data for the television program to provide a reliable trigger for selected events. The sending of these triggers, which can be what are known as information flags, can be embedded in the video and/or audio data received for that television program and the sending of the same is under the control of the television program editor and/or broadcaster. In any case, and with respect to a sports match, it is envisaged that the criteria selected by the user or which may be pre-selected by the broadcaster to indicate highlights of the television program, could be provided to identify when a player is out or a player has reached a certain score or so on. The monitoring of the television program will mean that when a player is out, the system according to the invention will be triggered to change condition. The change of condition can cause one or any of the activation of a signal to the user that the criteria occurrence has taken place, and/or the display on a television screen of the program following the occurrence of the criteria and/or the activation of a storage means 30 to record the program after the occurrence of a criteria. It is envisaged that the criteria will be identified and the system activated in time for the viewing and/or recording of a replay of the portion of television program in which the criteria occurred so that, for example, when a player is out, and the system causes the viewing of the television program, the user will be able to view an action replay of the event. Similarly, the storage means will be caused to record in time for the action replay.

The viewer can be alerted to the occurrence of selected criteria by a pre-defined alarm, which can be either on-screen display graphics 14, an audio alert 28, display of the actual occurrence, activation of an external device connected to an interface port on the receiver and/or the like. The user may be prompted to accept a channel change back to the channel being monitored for selected criteria, thereby allowing the user to view the particular program segment, such as an instant replay of a shot, a player out, a particular new item, feature in a magazine style program and/or the like.

Upon commencement of the display or recording of the television program, this can continue until stopped by the user or, alternatively, until a predesignated time has lapsed from the occurrence of the criteria.

An interactive application can be used to allow the user to enter the trigger events criteria, for example, the criteria can be selected using an EPG. Trigger criteria can be generated by the production editor of a program and sent to the receiver as encoded data, in a format proprietary to the broadcast system, such as low speed data in NDS (New Data Systems). A finite number of trigger events can be selected by the broadcaster from a list of possible trigger events for a given program type. These events can then be broadcast with the program content to update the monitoring application in the receiver. Alternatively, when any of the trigger criteria occur, a system in the television production suite can be alerted to this occurrence and the data broadcast to the receiver changes. The receiver detects this change and acts upon it accordingly, i.e., activating recording of the particular data segment.

Thus it will be appreciated that the invention according to the current application allows for the monitoring of a television program even when it is not being viewed by the user of the receiver apparatus. However the monitoring ensures that the user can at least be warned of the occurrence of a particular feature of the program in which they are interested and/or may be set to allow an indication of events which would be regarded as the highlights of the television program.

While the invention has been described with a certain degree of particularly, it is manifest that many changes may be made in the details of construction and the arrangement of components without departing from the spirit and scope of this disclosure. It is understood that the invention is not limited to the embodiments set forth herein for purpose of exemplification, but is to be limited only by the scope of the attached claim or claims, including the full range of equivalency to which each element thereof is entitled.

What is claimed is:

1. A television system including a broadcast data receiver for receiving audio or video digital data from a broadcaster relating to a plurality of television programs and display means for displaying a user-selected television program from the plurality of available television programs, said system comprises:

a means for selecting a television program for display; and means for monitoring the user selection of the same, or a further television program, for designated criteria, the monitoring means occurring at the broadcaster location and if the designated criteria is detected, then the broadcast data transmitted is altered in a manner to allow the broadcast data receiver to detect a change and activate at least one from the group consisting of: the alert, recording, and display of the selected television program.

2. A television system according to claim 1 wherein said broadcast data receiver is active and the content of the selected television program is monitored with respect to said designated criteria and, if said designated criteria are met, at least one of the following is activated: the alert, recording and display of the television program.

3. A television system according to claim 1 wherein said designated criteria relate to the audio data received.

4. A television system according to claim 3 wherein said designated criteria are selected from a group consisting of: the occurrence of a specific word or words in the audio data, a change in pitch of a commentary in the audio data received, a change in the audio data volume, and voice recognition of a particular word or phrase.

5. A television system according to claim 1 wherein said designated criteria is a particular occurrence in the video data.

6. A television system according to claim 1 wherein said designated criteria is generated by said broadcast data receiver in response to a signal indicating the selection of a television program by the user.

7. A television system according to claim 1 wherein said designated criteria to be monitored is selected by the broadcaster.

8. A television system according to claim 1 wherein said designated criteria to be monitored is selected by the user.

9. A television system according to claim 1 wherein said designated criteria on which the monitoring is based is selected in respect to the particular type or form of television program which is selected by the user to be monitored.

10. A television system according to claim 1 wherein the monitoring and detection of said designated criteria occurs at the broadcast data receiver on data received from the broadcast location and if said designated criteria is detected from at least one from the group consisting of: an alert, recording and display of the television program is generated by the broadcast data receiver.

11. A television system according to claim 1 wherein if said designated criteria is identified, then the television system is changed from a standby condition to an on condition or from a currently displayed television program, to display the television program which has been monitored and identified.

12. A television system according to claim 11 wherein the display of the program which has been monitored remains on the display screen for a pre-determined period of time, whereupon the display screen either returns to a standby mode or to a television program previously being watched.

13. A television system according to claim 1 wherein when said designated criteria is detected, data storage means connected to said broadcast data receiver or forming part of said receiver are activated and material from the selected television program in the form of audio data is recorded and held in said storage means.

14. A television system according to claim 1 wherein the system includes multiple front end tuners and transponders and upon the selection of a television program to be monitored one of the transponders is set to monitor the designated criteria for the selected particular television program.

15. A television system according to claim 1 wherein said designated criteria is a designated period of time.

16. A television system according to claim 1 wherein said digital data is audio.

17. A television system according to claim 1 wherein said digital data is video.

18. A television system according to claim 1 wherein said digital data is audio and video.

19. A television system according to claim 1 wherein when said designated criteria is detected, data storage means connected to said broadcast data receiver or forming part of said receiver are activated, and material from the selected television program in the form of video data is recorded and held in said storage means.

* * * * *